Feb. 6, 1968   J. W. LERCH   3,368,079
STRIP GUIDE FOR A PINHOLE DETECTOR
Filed Nov. 4, 1965   3 Sheets-Sheet 1
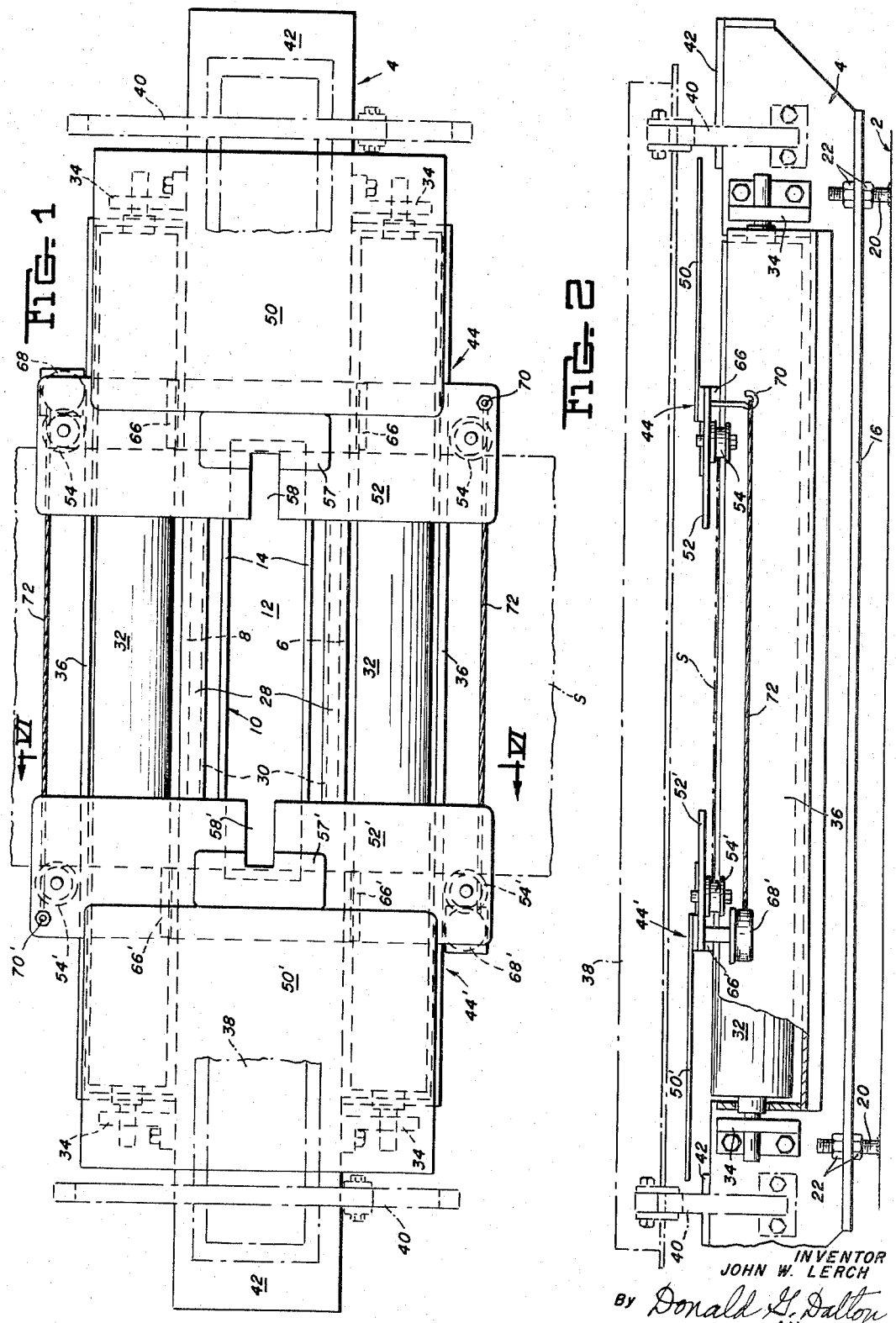
INVENTOR
JOHN W. LERCH
By Donald G. Dalton
Attorney

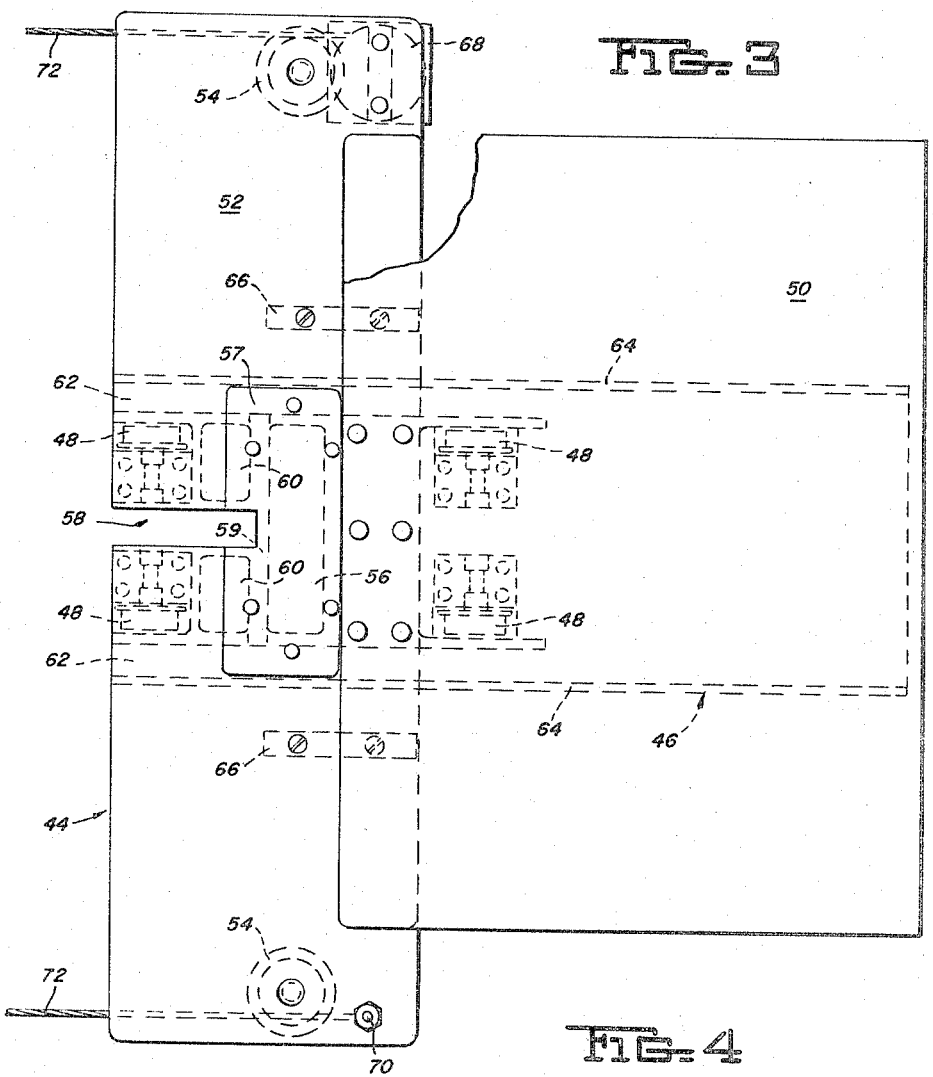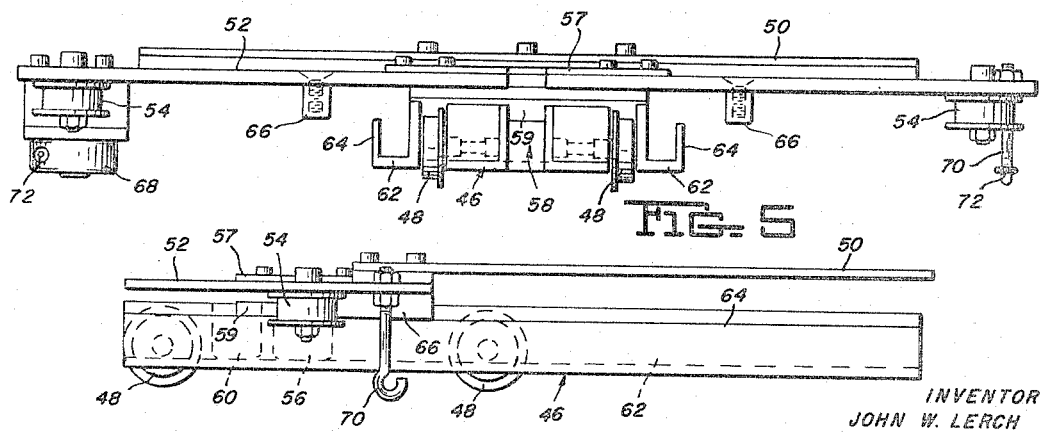

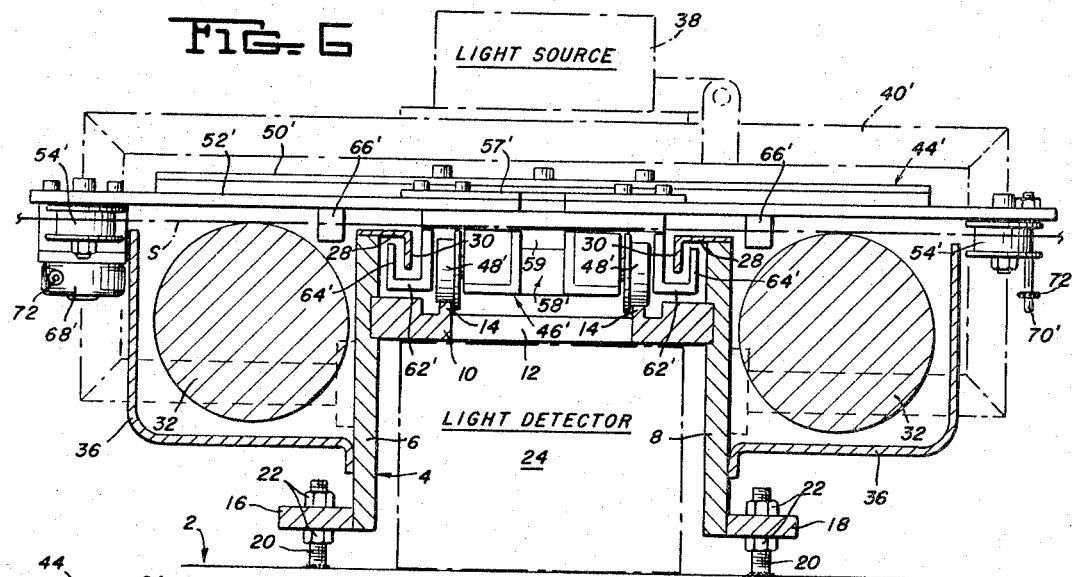
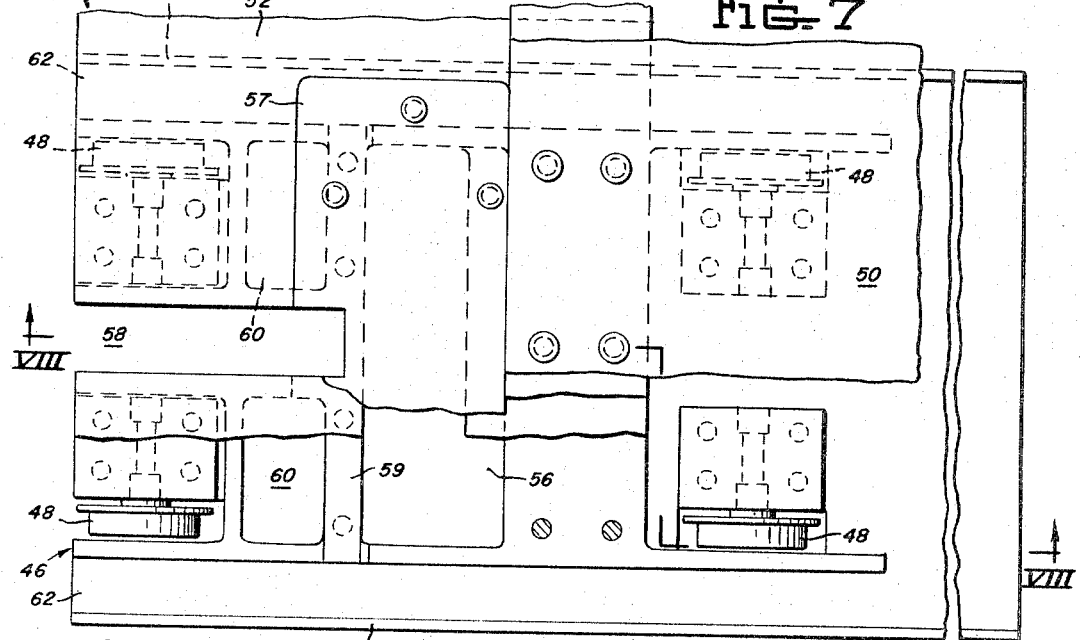
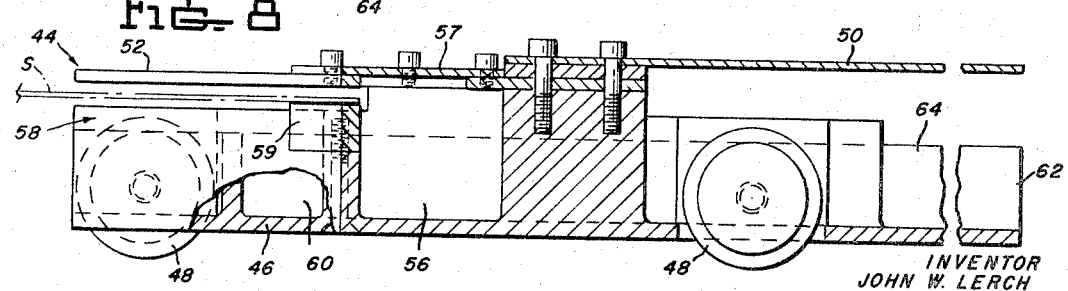

United States Patent Office 3,368,079
Patented Feb. 6, 1968

3,368,079
STRIP GUIDE FOR A PINHOLE DETECTOR
John W. Lerch, Falls Township, Bucks County, Pa., assignor to United States Steel Corporation, a corporation of Delaware
Filed Nov. 4, 1965, Ser. No. 506,333
11 Claims. (Cl. 250—219)

ABSTRACT OF THE DISCLOSURE

A strip guide for a pinhole detector in which magnetic rolls are provided to hold the strip so as to provide a non-rubbing positive light seal. A light trap is also provided in each carriage adjacent the end of a slot through which light passes to a light sensitive device with the light slot extending beneath the strip. Secondary light traps are provided on each side of the slot adjacent the first light trap.

---

This invention relates to a strip guide for a pinhole detector and more particularly to a detector for use in inspecting continuous opaque strip such as black plate and tin plate. Camp Patent No. 2,886,716 dated May 12, 1959, shows this type of apparatus. To prevent improper operation of the pinhole detector edge guides and shields have been provided with the edge guides and shields being mounted on opposed movable carriages. Those pinhole detectors of which I have knowledge have various disadvantages. The light seals may not entirely eliminate unwanted light from falling on the light detector, the strip being examined may not be maintained in a given horizontal plane during the inspection, and it may be necessary to mask too much of the strip edge so that holes will not be detected close to the edge of the strip.

It is therefore an object of my invention to provide a strip guide mechanism which will eliminate most of the disadvantages set forth above.

These and other objects will be more apparent after referring to the following specification and attached drawings, in which:

FIGURE 1 is a top plan view of the detector showing the two shutter assemblies in position;

FIGURE 2 is a side view of the apparatus of FIGURE 1;

FIGURE 3 is a top plan view of one shutter assembly;

FIGURE 4 is a view of the shutter assembly of FIGURE 3 taken from the left end thereof;

FIGURE 5 is a side view of the apparatus of FIGURE 3;

FIGURE 6 is a view taken on the line VI—VI of FIGURE 1;

FIGURE 7 is an enlarged detail of a portion of FIGURE 3; and

FIGURE 8 is a view taken on the line VIII—VIII of FIGURE 7.

Referring more particularly to the drawings, reference numeral 2 indicates the main support frame of a strip processing line for a moving steel strip S. A fixed frame 4 is supported on the frame 2 beneath the path of travel of strip S. The frame 4 consists of spaced apart plates 6 and 8 connected at their top by means of a horizontal plate 10 having a longitudinal hole 12 therein. The hole 12 extends transversely of the path of travel of the strip S and has a length greater than the maximum width of the strip. Two rails 14 are provided on top of plate 10, one on each side of the hole 12. Horizontal flanges 16 and 18 are provided at the bottom of plates 6 and 8, respectively. Frame 4 is attached to the support frame 2 by means of bolts 20 which are attached to the frame 2 and pass through holes in flanges 16 and 18 with nuts 22 on each side of the flanges 16 and 18. A light detector 24, which may be a photocell or series of photocells of any conventional type, is supported on the frame 2 between plates 6 and 8 with its upper surface abutting the underside of plate 10. Angles 28 which are attached to the top of plates 6 and 8 provide downwardly extending flanges 30. Horizontal magnetic rolls 32 are rotatably supported by means of brackets 34 secured to the frame 4. Light shields 36, also attached to the frame 4, extend longitudinally of the rolls 32 to prevent light from passing directly under the rolls toward the detector 24. The top of the rolls 32 provide the pass line for the strip S as it passes through the pinhole detector. A light source 38 of any conventional type is pivotally supported on brackets 40 attached to the frame 4. A plate 42 is attached to the top of the frame 4 at each end thereof.

Shutter assemblies 44 and 44′ are provided, one on each side of the path of travel of the strip S. Since the shutter assemblies are substantially identical only one will be described in detail with the parts of assembly 44′ being indicated by priming the reference numerals corresponding to the parts of assembly 44. The shutter assembly 44 includes a carriage 46 having four flanged wheels 48 which ride on rails 14 to move the shutter assembly transversely of the strip S so as to keep the shutter in proper position in relation to the edge of the strip. A cover 50 supported on the carriage 46 extends over the rear part of the carriage. A cover 52 mounted on the front of carriage 46 extends longitudinally of the path of travel of the strip. A double flanged guide wheel 54 is mounted on each end of the cover 52 with its axis vertical. The wheels 54 contact the edge of the strip S and there is enough play between wheels 48 and rails 14 to permit slight turning of the shutter to accommodate skewed strip. A light trap 56 having a removable cover plate 57 is provided in the carriage 46 with the forward end of the trap being substantially in alignment with the strip contacting surfaces of wheels 54. A slot 58 through the carriage 46 and plate 57 extends forwardly from the light trap 56 so as to permit passage of light from the light source 38 to the light detector 24. A rub block or rail 59 made of anti-scratch and anti-friction material, such as bronze, forms part of the wall of the light trap 56. A secondary light trap 60 is provided on each side of the slot 58. The surfaces of the light traps 56 and 60 and of all parts which might reflect light to the detector 24 are painted black so as to absorb light. Channels 62, provided on each side of the light trap 56, provide flanges 64 which are received between flanges 30 and plates 6 and 8. A light deflector 66 is attached to the bottom of cover 52 in spaced relationship to each channel 62. A constant tension spring device 68 is attached to the bottom of cover 52 at one end thereof. One suitable device is sold under the trademark Negator by Hunter Spring Division of Ametek, Inc. A hook 70 is attached to the other end of cover 52. A wire 72 extends between spring device 68 and hook 70′ and a similar wire 72′ between spring device 68′ and hook 70.

The operation of my device is as follows:

The strip S passing between the light source 38 and photo sensitive device 24 prevents light from shining on the photo sensitive device except when a pinhole occurs in the strip. The spring devices 68 and 68′ exert a constant pull to draw the shutter assemblies 44 and 44′ toward each other with the edges of the strip contacting the wheels 54. The strip S is held firmly against magnetic rolls 32 so as to provide a non-rubbing positive light seal and light trap across the width of the strip. They also provide stiffening for the strip so that the guide wheels will properly align the shutters to the edge of the strip regardless of strip skew. Light passing over the surface of the strip must enter the light trap 56 and is prevented from passing underneath the strip to the detector in a highly efficient manner. Any light entering this trap is contained because the unique configuration of the traps, with the feature of a pocket extending above, below, and outside the edge of the strip, offers a highly selective path for any reflected light to enter the detector under the strip. This light containment is also enhanced by close coupling of the underside of the strip to the anti-scratch and anti-friction material of the rub rail 59 and the closely controlled alignment of the edge of the strip and the inward wall of light trap 56 (controlled by guide wheels 54). In like manner light from diagonal points passing underneath the strip S toward the detector 24 is absorbed by the secondary light trap 60. Deflectors 66 also tend to intercept such light. To reach the detector beneath the carriage 46, light must pass through the space between the flanges 30 and 64. In the longitudinal direction of the strip, extraneous light must travel a path between rolls 32 and shields 36 in order to reach the detector 24. In the transverse direction, the plates 42 are interposed between the rear cover 50 and carriage 46, thus forming another U-shaped passageway through which light must pass to reach the detector 24. Thus it is seen that unwanted light is prevented from reaching the detector from any direction, but that detection of pinholes is obtained within ¼ in. of the strip edge with high sensitivity in this critical area.

While one embodiment of my invention has been shown and described it will be apparent that other adaptations and modifications may be made without departing from the scope of the following claims.

I claim:

1. Apparatus for guiding and shielding the edges of a strip passing through a pin hole detector or the like comprising a stationary frame, a pair of magnetic rolls rotatably supported on said frame in spaced apart relationship over which the strip passes, a pair of carriages mounted on said frame for movement with respect to one another transversely of the strip, means for urging said carriages inwardly toward the edges of said strip, guide means for the edges of said strip mounted on each of said carriages, and means on said carriages between said magnetic rolls for receiving and shielding the edges of said strip from unwanted light, each of said carriages having a slot therethrough in the forward end thereof.

2. Apparatus according to claim 1 in which said means for urging said carriages inwardly toward the edges of said strip includes a retractable constant tension spring mounted on the strip approach side of one carriage and the strip exit side of the other carriage, and a flexible member having one end connected to each spring and the other end connected to the opposed carriage; and said guide means includes a pair of spaced apart wheels mounted on each carriage adjacent said magnetic rolls.

3. Apparatus according to claim 1 in which said means for receiving and shielding the edges of the strip includes a light trap in each carriage adjacent the end of said slot extending beyond the sides thereof, and a light trap on each side of said slot adjacent said first named light trap.

4. Apparatus according to claim 1 in which said frame includes a pair of spaced apart rails extending parallel to the axes of said magnetic rolls, an inverted channel on the outside of each rail arranged parallel thereto, and a light shield surrounding the major portion of each magnetic roll including the lower portion thereof; and said carriage includes wheels thereon supported on said rails, and a flange extending downwardly into said inverted channels.

5. Apparatus according to claim 2 in which said means for receiving and shielding the edges of the strip includes a light trap in each carriage adjacent the end of said slot extending beyond the sides thereof, and a light trap on each side of said slot adjacent said first named light trap.

6. Apparatus according to claim 2 in which said frame includes a pair of spaced apart rails extending parallel to the axes of said magnetic rolls, an inverted channel on the outside of each rail arranged parallel thereto, and a light shield surrounding the major portion of each magnetic roll including the lower portion thereof; and said carriage includes wheels thereon supported on said rails, and a flange extending downwardly into said inverted channels.

7. Apparatus according to claim 3 in which said frame includes a pair of spaced apart rails extending parallel to the axes of said magnetic rolls, an inverted channel on the outside of each rail arranged parallel thereto, and a light shield surrounding the major portion of each magnetic roll including the lower portion thereof; and said carriage includes wheels thereon supported on said rails, and a flange extending downwardly into said inverted channels.

8. Apparatus according to claim 7 in which said means for urging said carriages inwardly toward the edges of said strip includes a retractable constant tension spring mounted on the strip approach side of one carriage and the strip exit side of the other carriage, and a flexible member having one end connected to each spring and the other end connected to the opposed carirage; and said guide means includes a pair of spaced apart wheels mounted on each carriage adjacent said magnetic rolls.

9. Apparatus for guiding and shielding the edges of a strip passing through a pinhole detector or the like comprising a stationary frame, a pair of carriages mounted on said frame for movement with respect to one another transversely of the strip, means for urging said carriages inwardly toward the edges of said strip, guide means for the edges of said strip mounted on each of said carriages, each of said carriages having a slot therethrough in the forward end thereof, and means on said carriages for receiving and shielding the edges of said strip from unwanted light, said last named means including a light trap in each carriage adjacent the end of said slot extending beyond the sides thereof, and a light trap on each side of said slot positioned entirely beneath the strip and adjacent said first named light trap.

10. Apparatus according to claim 9 including a rub rail forming part of the wall of the first named light trap, a pair of magnetic rolls rotatably supported on said frame in spaced apart relationship over which the strip passes and which hold the strip against said rail; said means for urging said carriages inwardly toward the edges of said strip including a retractable constant tension spring mounted on the strip approach side of one carriage and the strip exit side of the other carriage, and a flexible member having one end connected to each spring and the other end connected to the opposed carriage; said guide means including a pair of spaced apart wheels mounted on each carriage adjacent said magnetic rolls; said frame including a pair of spaced apart rails extending parallel to the axes of said magnetic rolls, an inverted channel on the outside of each rail arranged parallel thereto, and a light shield surrounding the major portion of each magnetic roll including the lower portion thereof; and said carriage including wheels thereon supported on said rails, and a flange extending downwardly into said inverted channels.

11. Apparatus for guiding and shielding the edges of a strip passing through a pinhole detector or the like comprising a stationary frame, a pair of carriages mounted on said frame for movement with respect to one another transversely of the strip, means for urging said carriages inwardly toward the edges of said strip, guide means for the edges of said strip mounted on each of said carriages, each of said carriages having a slot therethrough in the forward end thereof, a light source provided on one side of the path of travel of said strip, a light detector supported on the other side of said path of travel of said strip, and means on said carriages for receiving and shielding the edges of said strip from unwanted light, said last named means including a relatively large light trap in each carriage adjacent the end of said slot extending beyond the sides thereof, said light trap extending a substantial distance beyond the edge of said strip and a substantial distance from said strip toward the light detector, the walls of said trap having light absorbing surfaces.

References Cited

UNITED STATES PATENTS

| | | | |
|---|---|---|---|
| 2,229,638 | 1/1941 | Chamberlin et al. | 209—111.7 |
| 2,395,181 | 2/1946 | Hags | 250—219 |
| 2,739,503 | 3/1956 | Nieman et al. | 88—14 |
| 2,820,908 | 1/1958 | Linderman | 226—198 |
| 2,886,716 | 5/1959 | Camp | 250—219 |
| 2,979,984 | 4/1961 | Rosen | 88—14 |
| 3,125,682 | 3/1964 | Linderman et al. | 250—219 |
| 3,255,356 | 6/1966 | Brosious et al. | 88—14 |

ALLEN N. KNOWLES, *Primary Examiner.*

UNITED STATES PATENT OFFICE
CERTIFICATE OF CORRECTION

Patent No. 3,368,079                          February 6, 1968

John W. Lerch

It is hereby certified that error appears in the above numbered patent requiring correction and that the said Letters Patent should read as corrected below.

In the heading to the printed specification, lines 3 to 5, for "John W. Lerch, Falls Township, Bucks County, Pa., assignor to United States Steel Corporation, a corporation of Delaware" read -- John W. Lerch, Falls Township, Bucks County, Pa. (209 Suffolk Road, Fairless Hills, Pa. 19030) --; column 4, line 22, for "carirage" read -- carriage --.

Signed and sealed this 29th day of April 1969.

(SEAL)
Attest:

Edward M. Fletcher, Jr.                          EDWARD J. BRENNER
Attesting Officer                               Commissioner of Patents